Sept. 28, 1965 E. I. ODELL 3,208,578
METHOD AND APPARATUS FOR ORIENTING ARTICLES
Filed April 3, 1963 2 Sheets-Sheet 1

INVENTOR.
EUGENE I ODELL
BY
ATTORNEYS

Sept. 28, 1965 E. I. ODELL 3,208,578

METHOD AND APPARATUS FOR ORIENTING ARTICLES

Filed April 3, 1963 2 Sheets-Sheet 2

INVENTOR.
EUGENE I. ODELL
BY *Price & Heneveld*
ATTORNEYS

United States Patent Office 3,208,578
Patented Sept. 28, 1965

3,208,578
METHOD AND APPARATUS FOR ORIENTING ARTICLES
Eugene I. Odell, Spring Lake Township, Ottawa County, Mich., assignor to Dake Corporation, Grand Haven, Mich., a corporation of Michigan
Filed Apr. 3, 1963, Ser. No. 270,282
9 Claims. (Cl. 198—33)

This invention relates to an apparatus for continuously arranging magnetically responsive, elongated objects in a filed array, and more particularly to a bolt or screw orienting and aligning apparatus, especially for automatically and continuously filing bolts past a counter.

To profitably market bolts, especially large ones, an accurate count of them is necessary for control purposes. To achieve automatic, continuous counting of thousands upon thousands of conveyed bolts by moving them past a counter, the bolts must be accurately and uniformly aligned in a filed array one behind the other. Of presently known devices intended to achieve this, none is capable of high speed, efficient, dependable operation with no recycling of the bolts.

It is therefore an object of this invention to provide an apparatus for arranging elongated, magnetically responsive articles such as bolts in a filed array, which orients and aligns the objects continuously, automatically extremely rapidly, dependably, efficiently and without recycling of the bolts through the apparatus. After alignment all bolts are conveyed in a single file past counter means.

It is another object of this invention to provide a filing apparatus, especially for bolts, employing a mangetic field to orient the conveyed articles, in cooperation with guide means to align the bolts on a continuous basis, and means to convey the bolts continuously through the magnetic field. The bolts move into the magnetic field in complete disarray, and out of the magnetic field in exact filed array, held spaced from each other. The aligned bolts may then be countered or otherwise handled or treated as necessary. The apparatus can orient and align even very large bolts several inches long in the magnetic field, and convey them continuously out of the field while held by the magnetic field in this oriented and aligned condition. The magnetic field is sustained constantly, even while the bolts are being removed, to provide continuous operation on bolts entering, traversing and leaving the field. The apparatus requires no human operation other than initiation, and normal maintenance and trouble shooting.

It is another object of this invention to provide apparatus for orienting, aligning and guiding bolts, while simultaneously automatcally holding the bolts spaced from each other to assure alignment without jamming the aligner, even at high flow rates.

These and other objects of this invention will be apparent upon studying the following specification in conjunction with the drawings in which.

Figure 1:
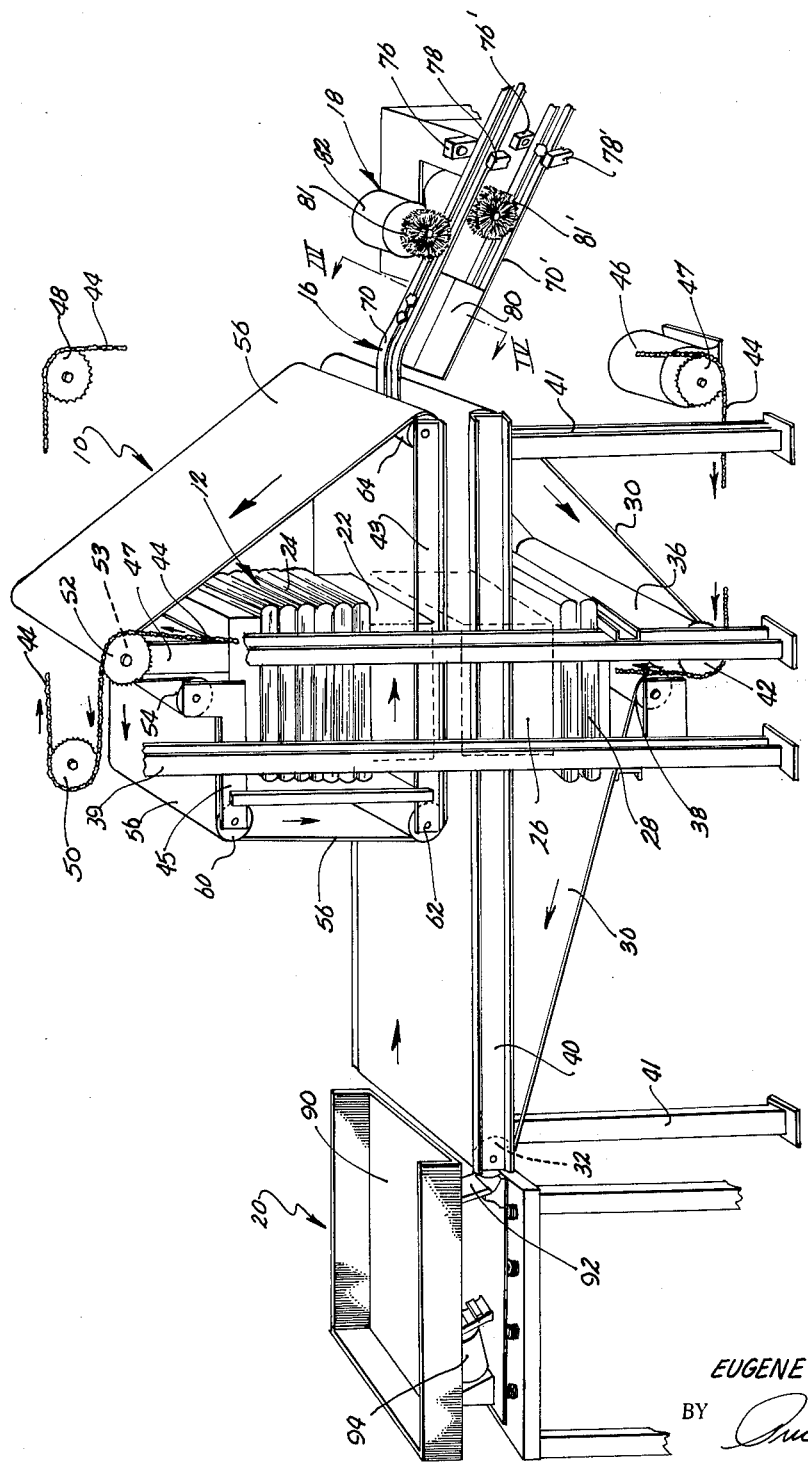
FIG. 1 is a perspective view of the novel apparatus in combination with a counter mechanism.

Basically, the inventive apparatus for positioning elongated, magnetically responsive objects such as bolts in an orderly filed array comprises, a pair of facing, vertically spaced, magnetic pole means forming a magnetic orienting field therebetween, conveyor means such as a belt to convey randomly positioned bolts between the poles where they are up-ended continuously by the magnetic field, laterally-converging guide means to align the up-ended objects as they traverse the field between the poles, and a cooperating conveyor means in the form of an upper belt which converges vertically on the axial ends of the up-ended bolts to grip the ends and forcefully convey the bolts between the laterally converging guide means out of the magnetic field where they are slid down a slotted guide ramp, and past a counter. The inverted or upside-down bolts falling through the guide ramp are reinverted, preferably by a V-shaped guide onto a second set of tracks or slotted guide ramp, and past a second counter.

Referring now specifically to the drawings, the inventive apparatus 10 includes magnetic alignment means 12, conveying means 14, guide track and ramp means 16, and counter means 18. Vibratory conveyor feed 20 is incidental to the invention.

Figure 2:
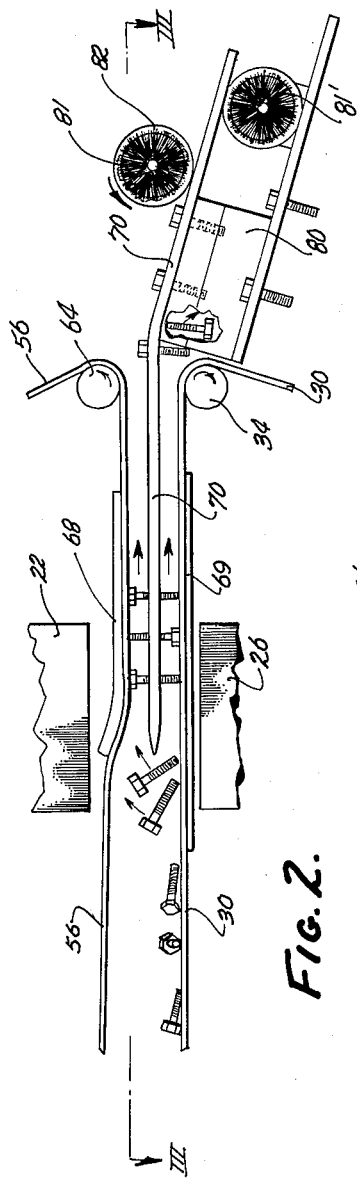
FIG. 2 is a side elevational view of a portion of the apparatus.

The magnetic orienting means comprises a upper pole 22 having electrical windings 24, and a lower pole 26 having windings 28. A magnetic field is created across conveyor 14 between the vertically spaced pole pieces. The electro magnets are mounted between suitable uprights 39 spaced on opposite sides thereof. Conveyor 14 comprises a lower belt 30 traveling around rollers 32, 34, 36 and 38. These rollers are rotatably mounted between suitable supports 40 of channel section or the equivalent, supported on legs 41. One of the rollers 36 includes a sprocket 42 driven by chain 44 from sprocket 47 on motor 46. This chain passes from spricket 47 around sprocket 42 up, around sprocket 52 affixed to roller 53 to drive upper conveyor belt 56, around idle sprockets 50 and 48, and returns to sprocket 42. Upper belt 56, like lower belt 30, moves to the right between the poles as viewed in FIG. 1, as it passes around rollers 53, 54, 60, 62 and 64. These rollers are rotatably mounted between supports 43, 45 and 47 affixed to uprights 39. As the upper belt approaches pole pieces 22 and 26, it is spaced from lower belt 30 (FIG. 2) a distance greater than the length of the individual bolts to be oriented and aligned for placement in single file. This spacing allows the bolts to be readily up-ended by the magnetic field, with interference by the upper belt as they are conveyed by lower belt 30 between the pole pieces. The upper belt then is shifted gradually toward the lower belt to be vertically convergent therewith as the belts pass between the pole pieces. This is achieved by a fixed, vertically slanted, deflector plate 68 which forces the upper belt downwardly towards the lower belt. The resultant spacing is then slightly less than the length of the bolts being oriented so that the belts forcefullly grip both ends of the up-ended bolts to convey them outof the holding force of the magnetic field. The belts have the same speed to achieve this. The lower belt is prevented from deflecting downwardly at this point by a suitable plate support 68 (FIG. 2).

Projecting between the magnetic pole pieces is a pair of guides formed by guide rails 70. Any number of such pairs may be provided side by side, but only one is shown for simplicity. Each set may be supported between the belts suitable laterally extending rod brackets 74 having their outer ends affixed to the frame. Each pair of guide tracks has a wide mouth 76 which converges to form a narrow, sloted guide path 73 of a width less than the width of the head on the respective bolts but greater than the shank width. Thus, as the beltsgrip the magnetically up-ended bolts and forcefully convey them out of the magnetic field, they are automatically laterally aligned one behind the other by the convergent guide pieces and pass in single filed array through the guide slot.

The bolts can flow through the converging aligner at large flow rates and at high speeds without jamming.

The magnetic field automatically causes the adjacent bolts to separate from each other a fraction of an inch to provide a definite clearance therebetween. Consequently, the leading bolt is the first to pass through the slot guide, while the others automatically fall into alignment and do not jam the guide as they converge due to the automatic spacing resulting. This is probably due to the like magnetic charge on the upper ends of adjacent bolts, and on the lower ends, causing mutual repulsion therebetween. Because of this factor, the speed of the bolts through the guides can be at a rate faster than the eye can follow, while still being completely orderly in spite of the converging action of several hundred bolts.

Figure 3:
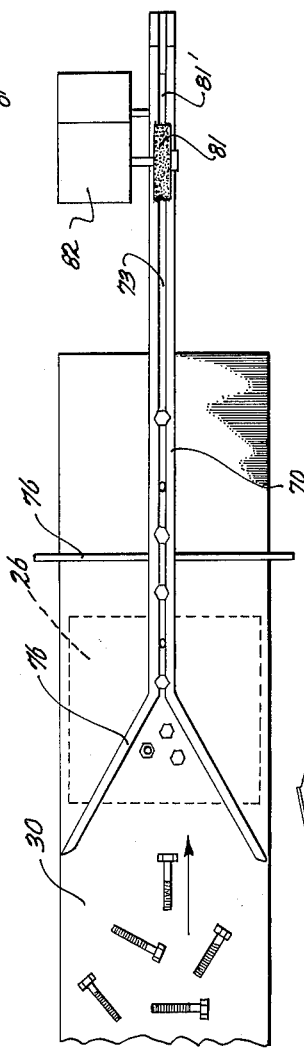
FIG. 3 is a sectional view taken on the plane III—III of FIG. 2.
Figure 4:
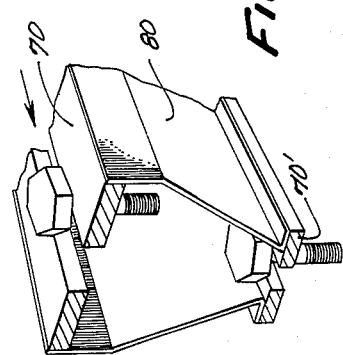
FIG. 4 is a sectional view taken on plane IV—IV of FIG. 1.

After the bolts are removed from the magnetic field, the belts pass around rollers 34 and 64 to diverge and release the bolts. The bolts then slide down the tilted slotted track or ramp 70 on the bottom of their heads. Since the bolts are randomly positioned before they enter the magnetic field (see FIG. 3), and since the follower end of each conveyed bolt always up-ends, some of the bolts will be upright, and some will be upside-down or inverted as they are aligned and conveyed between the belts and out of the magnetic field. Thus, as the bolts depart and allow the bolts to slide down ramp 70, some will have their heads resting on the track and other will fall through the tracks as illustrated in FIG. 2. A trough invertor 80 is provided beneath track 70. This invertor 80 may be secured to the track 70 as illustrated in FIG. 4, and has a generally V-shaped configuration with the bottom being a second set of tracks or slanted ramp 70'. Thus, inverted bolts falling through tracks 70 are rotated end for end as they fall between the walls of trough 80 and end up in an upright orientation on lower track 70'.

Preferably, the apparatus is combined with a counter mechanism 18 which may include any suitable type of recording sensor such as a photoelectric eye 76 on the upper track and 76' on the lower track, each with a detector, 78 on the upper track and 78' on the lower track. In order to space the bolts for proper counting a revolving wheel 81 of felt, rubber, plastic, or the like with a resilient periphery rotates rapidly in contact with the bolt heads to accelerate the bolts down the chute and space them sufficiently to enable proper detection with the counter. This wheel may be driven by a suitable motor 82. A similar revolving wheel 80' is provided for the lower track 70'.

To feed conveyor 30 with bolts in a distributed manner, a suitable vibratory feeding means 20 of conventional type may be used. This conventionally comprises a receptacle 90 mounted on suitable oscillating springs 92 and controlled by vibratory motor or camming mechanism 94 to vibrate bolts out of the receptacle 90 onto conveyor 30.

*Operation*

To count bolts or orient them for some other purpose, a batch of bolts is dumped into receptacle 90 and motor 94 is started. Also, motor 46 for the conveyor belts, motors 82 for the revolving wheels, photoelectric counters 76 and 76', and the magnetic means 12 are all activated. As the bolts are vibrated from receptacle 90 onto lower conveyor belt 30, they are conveyed toward the magnetic heads. As they pass between the magnetic poles, the magnetic field causes the rear follower end of each bolt to be up-ended as illustrated in FIG. 2. These up-ended bolts are then gripped slightly by the vertically converging conveying belts 30 and 56 on the axial ends thereof, as they are simultaneously shifted laterally by guide mouth 76 to align them in a filed array. As the belts are converging on the ends of the bolts, and as the bolts are rapidly being directed toward the slot by the mouth of the guide means, the mutual magnetic repulsion between the bolts automatically spaces them and prevents jamming in the guide mouth. They therefore align neatly, forcefully, and rapidly in orderly array to form a file of substantially uniformly spaced pieces. The conveyor belts then grip the bolt ends tighter, and forcefully to move the bolts out of the magnetic field between the guide tracks. After the bolts are removed a sufficient distance from the magnetic field to be unresponsive thereto, the belts part, i.e., diverge, allowing the heads of the bolts to fall onto track 70 so that the upright bolts catch on the track and slide down to the revolving wheel 80 which accelerates the bolts to a spaced relationship past counter 76. They may be then placed in suitable receptacles or the like. If desired, the bolts may be segregated on the basis of the counted number by using suitable gate means (not shown) or shifting receptacles (not shown) actuated in response to a predetermined count.

The bolts which fall through track 70 are inverted by the V-shaped trough 80 so that their heads catch on track 70' with the shank projecting through the narrow slot in the tracks. These bolts then slide down track 70', are accelerated by wheel 80' past counter 76' and sensor 78'.

The entire operation requires only a matter of seconds for hundreds of bolts to pass from one end to the other. It requires no recycling of articles. It efficiently, effectively aligns every one of thousands of articles moving rapidly in a single pass through the apparatus. It is realized that the conveyors, the lateral guide means, and the track means may all be modified in various manners within the principles of this invention. The illustrated embodiment is intended as an example and not to be limiting in nature. The novel orienting aligning system and apparatus is believed to be unique, thus the invention is to be limited only by the scope of the appended claims, and the reasonably equivalent structures to those defined therein.

I claim:

1. An apparatus for automatically, continuously orienting elongated, magnetically-responsive objects of relatively uniform length, comprising: spaced facing magnetic pole means forming a magnetic field therebetween; transfer means to place randomly positioned objects in said magnetic field for orientation of the objects; and object end-gripping means operably driven across said field, and including guide means in operative engagement with said end-gripping means and causing said end gripping means to converge on the ends of the oriented objects in said magnetic field and forcefully guidingly shift said objects out of said magnetic field in their oriented condition.

2. An apparatus for arranging randomly positioned, magnetically-responsive, elongated objects into a field array, comprising: magnet means for forming a magnetic orienting field; transferring means to place the random objects in said magnetic field for common orientation; channel guide means having a convergent mouth means adjacent said magnetic field to receive oriented objects and place them in aligned form; and driving means to shift said aligned objects out of said magnetic field through said channel guide means.

3. An apparatus for continuously arranging elongated, magnetically-responsive, randomly positioned articles into orderly filed array, comprising: spaced cooperative magnetic pole means forming a magnetic field therebetween to up-end and orient articles; conveyor means adapted to continuously move random articles into the magnetic field to cause said articles to become oriented; channel guide means extending partly out of said magnetic field; said guide means having a convergent mouth and channel width slightly greater than the shank width of said articles to receive said articles in file in their oriented condition; and conveying means adapted to physically force said articles into said channel guide means and out of said magnetic field.

4. A continuous bolt arranging apparatus comprising: a pair of cooperative, vertically-spaced magnetic pole members creating a magnetic field to orient bolts; a pair of vertically spaced belts adapted to travel in a manner spaced from each other and between said pole members;

one of said belts adapted to convey bolts between said pole members to be oriented and held spaced from each other; said belts converging between said pole members sufficiently to forcefully move the oriented bolts from between said pole members.

5. A continuous bolt arranging apparatus comprising: a pair of cooperative, vertically-spaced magnetic pole members creating a magnetic field to orient bolts; a pair of vertically spaced belts adapted to travel in a manner spaced from each other and between said pole members; one of said belts adapted to convey bolts between said pole members to be oriented and held spaced from each other; said belts converging between said pole members sufficiently to forcefully move the oriented bolts from between said pole members; and guide channel means between said belts adapted to receive oriented bolts forcefully moved by said belts to align them in an orderly array.

6. A bolt arranging apparatus, comprising: a pair of facing, vertically-spaced, magnetic poles forming a magnetic field therebetween; a first, lower conveyor belt adapted to carry bolts between said poles to cause them to be up-ended to a vertical orientation; a second, upper belt spaced from said lower belt and moving in the same direction and at the same speed as said lower belt; said belts being convergent toward each other between said poles to a spacing slightly less than the length of said bolts to grip the ends of said bolts and force them from between said poles; and channel guide means having convergent mouth means to receive oriented bolts, and having a channel being wider than the bolt shank and narrower than the bolt head to allow the bolts to skid along the channel in a file.

7. A bolt handling apparatus comprising: a pair of facing, vertically-spaced, magnetic poles forming a magnetic field therebetween; a first, lower conveyor belt adapted to carry bolts between said poles to cause them to be vertically oriented, magnetically; a second, upper belt moving in the same direction as said first lower belt and convergent toward said first belt between said poles to a spacing substantially equal to the length of said bolts; said belts adapted to frictionally grip the ends of said bolts and force them from between said poles; channel guide means having convergent mouth means to receive oriented bolts, with the channel being wider than the bolt shank and narrower than the bolt head to allow the bolts to skid along the channel in a column; and counter means along said channel to count the bolts passing in a file.

8. A bolt handling apparatus comprising: a pair of facing, vertically-spaced, magnetic poles forming a magnetic field therebetween; a first, lower conveyor belt adapted to carry bolts between said poles to cause them to be vertically oriented, magnetically; a second, upper belt moving generally in the same direction as said first lower belt and convergent toward said first belt between said poles to a spacing substantially equal to the length of said bolts; said belts adapted to frictionally grip the ends of said bolts and force them from between said poles; channel guide means having convergent mouth means to receive oriented bolts, with the channel being wider than the bolt shank and narrower than the bolt head to allow the bolts to skid along the channel in a column; and inverting means below said channel guide for receiving head-down bolts dropping through said channel, and inverting them; and a second lower channel guide means for receiving the inverted bolts.

9. A bolt handling apparatus comprising: a pair of facing, vertically-spaced, magnetic poles forming a magnetic field therebetween; a first, lower conveyor belt adapted to carry bolts between said poles to cause them to be vertically oriented, magnetically; a second, upper belt moving generally in the same direction as said first lower belt and convergent toward said first belt between said poles to a spacing substantially equal to the length of said bolts; said belts adapted to frictionally grip the ends of said bolts and force them from between said poles; channel guide means having convergent mouth means to receive oriented bolts, with the channel being wider than the bolt shank and narrower than the bolt head to allow the bolts to skid along the channel in a column; inverting means below said channel guide for receiving head-down bolts dropping through said channel, and inverting them, including a second lower channel guide means for receiving the inverted bolts; and a counter means adjacent each channel means.

References Cited by the Examiner

UNITED STATES PATENTS

| 1,080,435 | 12/13 | Gamper | 198—33.1 X |
| 1,109,259 | 9/14 | Sons | 198—165 |

SAMUEL F. COLEMAN, *Primary Examiner.*

EDWARD A. SROKA, *Examiner.*